INVENTOR.
LUIS W. ALVAREZ

Dec. 17, 1963 L. W. ALVAREZ 3,114,832
X-RAY SPECTROSCOPIC SYSTEM COMPRISING PLURAL
SOURCES, FILTERS, FLUORESCENT RADIATORS, AND
COMPARATIVE DETECTORS
Filed July 28, 1960 5 Sheets-Sheet 4
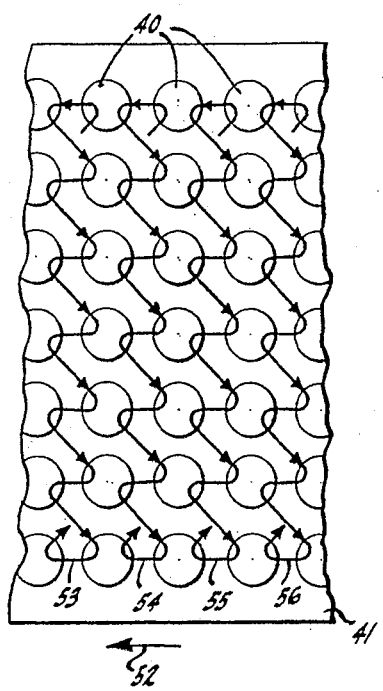
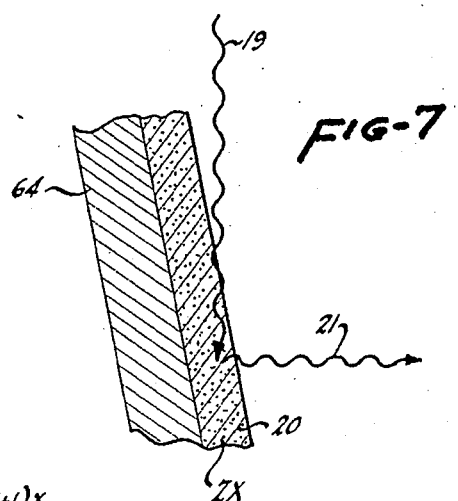
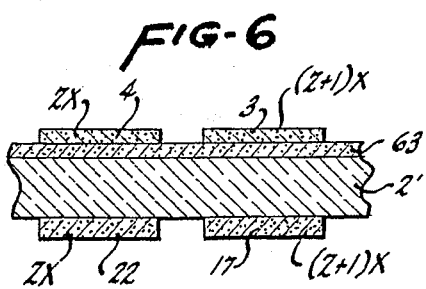
INVENTOR.
LUIS W. ALVAREZ
BY
Lippincott, Rally & Hendricson
ATTORNEYS

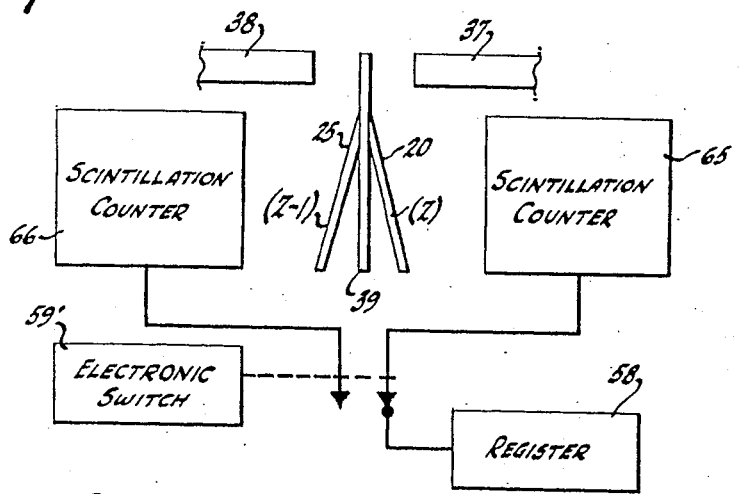
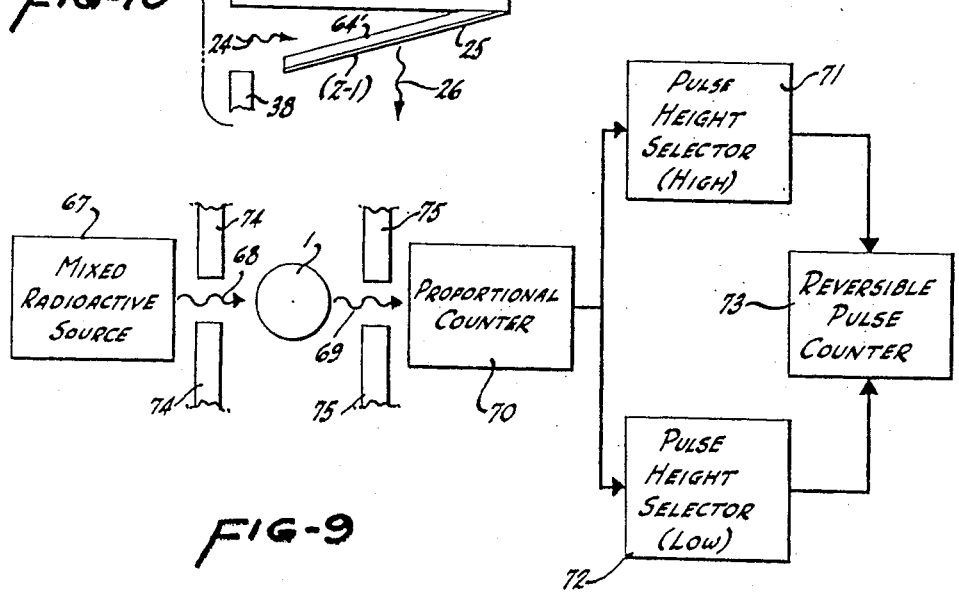

United States Patent Office 3,114,832
Patented Dec. 17, 1963

3,114,832
X-RAY SPECTROSCOPIC SYSTEM COMPRISING PLURAL SOURCES, FILTERS, FLUORESCENT RADIATORS, AND COMPARATIVE DETECTORS
Luis W. Alvarez, Berkeley, Calif., assignor to Radiation Counter Laboratories, Inc., of California, Berkeley, Calif., a corporation of California
Filed July 28, 1960, Ser. No. 45,927
6 Claims. (Cl. 250—51.5)

This invention relates to X-ray spectroscopic method and apparatus for detecting the presence or absence of a selected element, e.g., for determining whether or not given bodies of matter contain tin or other selected elements. The chief object is to make such determination quickly, reliably, and inexpensively, regardless of the location or distribution of the selected element within the body, without dissection or other alteration of the body. Other objects and advantages will appear as the description proceeds.

Use is made of the X-ray absorption edges of the elements, preferably the K edges, by directing through the body X-rays of two different, each substantially homogeneous wavelengths, one slightly longer and one slightly shorter than the wavelength of an absorption edge of the selected element, and both lying between the corresponding absorption edges of the next-higher element and the next-lower element in atomic number. For purposes of this invention, X-rays, whose wavelengths fall within the narrow range between corresponding absorption edges of two elements having consecutive atomic numbers, can be considered homogeneous and effectively of a single wavelength. The selected element, having an absorption edge between the two chosen wavelengths, will absorb a larger proportion of the shorter wavelength, while every other element will absorb a larger proportion of the longer wavelength. Hence, greater absorption of the shorter wavelength is a highly reliable indication that the selected element is present.

Preferably, absorption is measured by measuring changes in the intensities of the transmitted X-rays. X-rays of the two wavelengths are supplied by reasonably stable sources, either electronic or radioactive, and the intensities of the X-rays transmitted through a body are measured at each wavelength, either concurrently or successively. It is convenient to adjust the apparatus so that the two measurements are approximately equal in the absence of the selected element; thereafter, the measurements will remain nearly equal, irrespective of the degree to which the absolute intensities of the two wavelengths may be attenuated (nearly equally) by any substance other than the selected element. Absorption by the selected element results in a relatively large difference between the two measurements, of opposite sense to the differences produced by other absorptions, which is but little affected by the absolute value of the total attenuation over a considerable range.

The foregoing and other aspects of the invention may be understood more fully from the following illustrative description and the accompanying drawings.

FIG. 1 of the drawings is a graph showing the mass absorption coefficients for a number of elements over a range of wavelengths including several K absorption edges.

FIG. 5 is a schematic illustration of the scanning sequence followed in operation of the FIG. 4 apparatus.

FIG. 6 is a somewhat schematic sectional detail of the target-and-filter structure of the X-ray tube in the FIG. 4 apparatus.

FIG. 7 is a somewhat schematic sectional detail of a radiator structure in the FIG. 4 apparatus.

FIG. 8 is a fragmentary schematic diagram showing a modification of the FIG. 3 apparatus.

FIG. 9 is a schematic diagram of still another embodiment.

FIG. 10 is a fragmentary schematic showing an alternative radiator arrangement.

Figure 1:
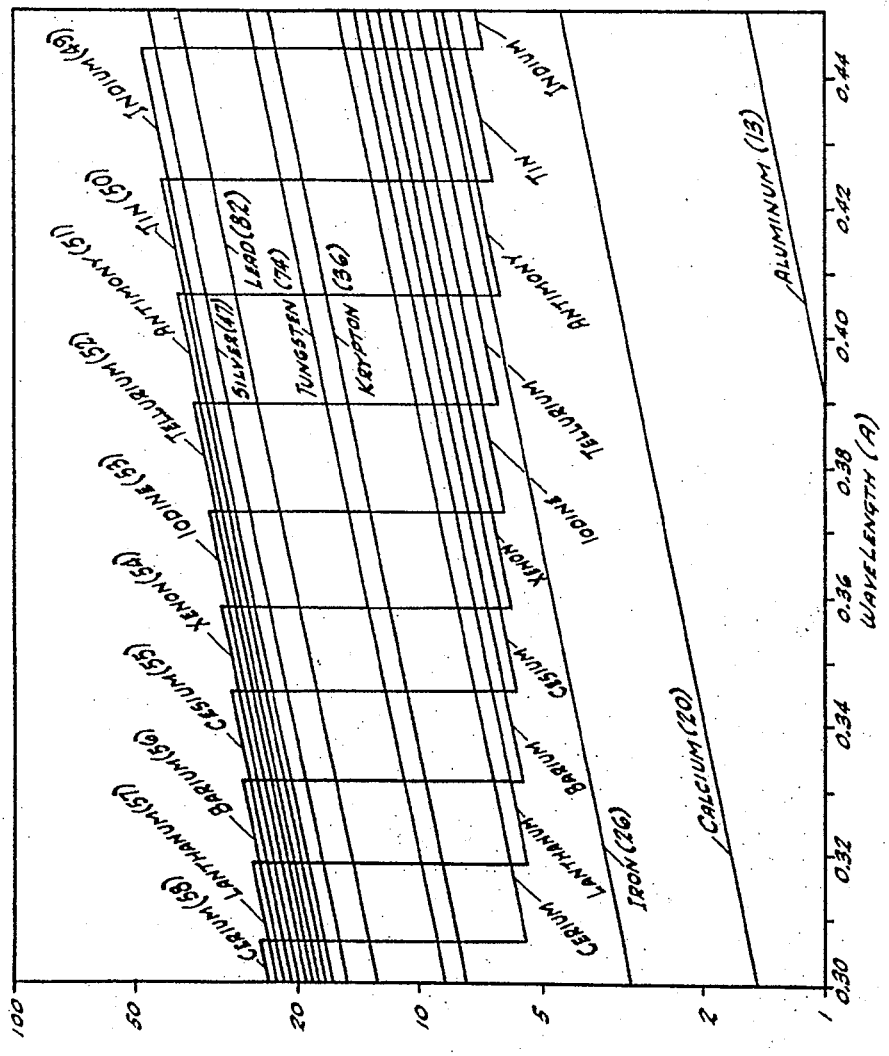

Referring to FIG. 1, the sloping lines represent the mass absorption coefficients for the several elements named over a range of wavelengths from 0.30 to 0.45 angstrom unit, on a semi-log plot. The numbers in parentheses following the names of the elements designate their atomic numbers. As a general rule, the absorption of X-rays by an element increases as the atomic number of the element increases, i.e., calcium (atomic number 20) absorbs a larger proportion of the X-rays directed through it than does an equal mass of aluminum (atomic number 13); and iron (atomic number 26) absorbs more than calcium. Hence, lead is a good radiation shield because of its large atomic number (82). Also, in general, long wavelengths are absorbed more readily than short wavelengths, as is indicated in FIG. 1 by the general tendency of the lines to slope upward from left (short wavelengths) to right (long wavelengths).

Exceptions to these general rules are found at wavelengths near the absorption edges of the various elements. Consider iodine, for example. As the X-ray wavelength increases, there is a steady increase in the absorption coefficient, in accordance with the general rule, until the wavelength of approximately 0.373 angstrom unit is reached. At this point, the absorption coefficient suddenly drops to a little less than one-fifth of its immediately preceding value. This is the K absorption edge for iodine. FIG. 1 shows a number of these K absorption edges, those for different elements occurring at different wavelengths, the wavelength of the absorption edge becoming shorter as the atomic number increases. There are other absorption edges, e.g., the L absorption edges at longer wavelengths. In general, the K edges are most suitable for purposes of the present invention because they occur within the wavelength range where the penetrating power of X-rays has appropriate values.

By measuring the difference in the absorption of X-rays at wavelengths just above and just below an absorption edge of a selected element, a unique determination can be made of whether or not a quantity of the element is present. For example, if we direct into a body of matter X-rays of wavelengths lying between the absorption edges of xenon and iodine and measure the proportion of said X-rays absorbed, and then repeat the procedure using X-rays of wavelengths between the absorption edges of iodine and tellurium, the measured absorption in the second measurement will exceed that in the first whenever there is no iodine in the body examined, because every element except iodine absorbs more X-rays at the longer of the two wavelengths selected than it does at the shorter wavelength. Iodine, on the other hand, absorbs the shorter wavelength much more readily, the mass absorption coefficient being approximately five times as great at the shorter of the two selected wavelengths. Thus, it is apparent that the measurements described provide a sensitive, highly reliable test for the presence of iodine, or, using different pairs of wavelengths, for other selected elements.

To make the measurements described, sources of substantially homogeneous X-rays of accurately defined wavelengths are needed. Fortunately, the X-ray emission spectra of the various elements contain appropriately placed spectral lines, which can be utilized. All that is required is to select appropriately spaced spectral lines, choose electronic or radioactive X-ray sources exhibiting these lines in their spectra, and then filter out or otherwise render ineffective undesired components of the source radiation at other wavelengths. The last-mentioned of these steps presents the greatest problem, which, however, is solved by novel means hereinafter described.

Figure 2:
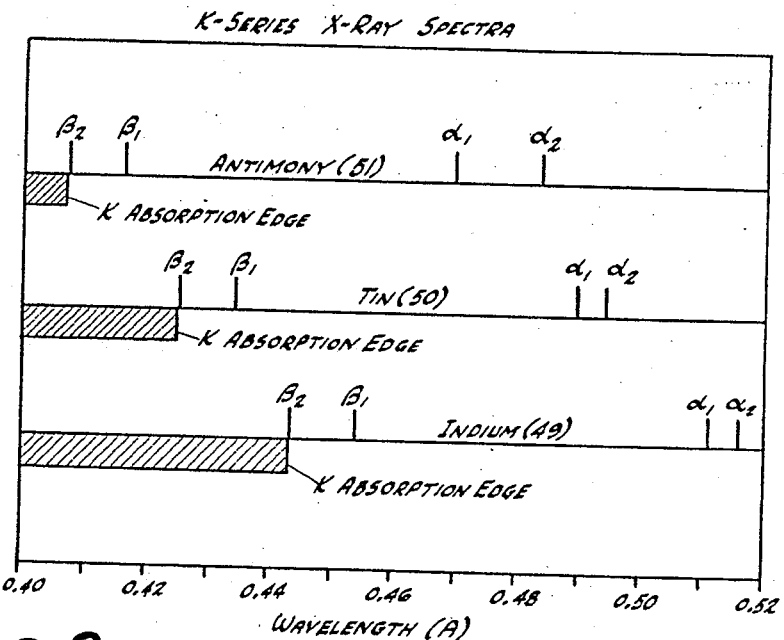
FIG. 2 is a graph showing wavelengths of the K lines in the emission spectra of several elements, related to the wavelengths of their K absorption edges, the crosshatched bars representing relatively large absorptions at wavelengths somewhat shorter than the absorption edge.

Referring now to FIG. 2, the location of K lines in the emission spectra relative to the K absorption edges are illustrated for three elements having successive atomic numbers, indium (49), tin (50), and antimony (51). The K lines of the emission spectra are further identified by the customary symbols $\alpha_1$, $\alpha_2$, $\beta_1$ and $\beta_2$. The shaded bars represent the relatively high absorptions at wavelengths somewhat shorter than the absorption edge.

Assume that tin is the element that we wish to detect. There is a need for X-rays of wavelengths between the K absorption edge of tin and the K absorption edge of antimony, the element of next higher atomic number. The $K_{\beta 1}$ and $K_{\beta 2}$ lines of the antimony emission spectrum lie within this range. Also needed are homogeneous X-rays of a wavelength between the K absorption edge of tin and the K absorption edge of indium, the element of the next lower atomic number. The $K_{\beta 1}$ and $K_{\beta 2}$ lines in the emission spectrum of tin lie within this wavelength range. Hence, there is no particular difficulty in obtaining X-ray sources that include narrow-band components in the desired wavelength ranges.

There remains a problem of removing or rendering ineffective components of other wavelengths, such as the $K_{\alpha 1}$ and $K_{\alpha 2}$ lines of the emission spectra discussed, as well as the continuous spectrum of "white" X-rays which may be concurrently generated. As more fully described hereinafter, this filtering or selection problem can be solved in either of two ways. One way is to arrange elements having adjacent K absorption edges in such a manner as to form an X-ray band-pass filter, and another is to use an X-ray counter having highly selective responses to different wavelengths.

Figure 3:
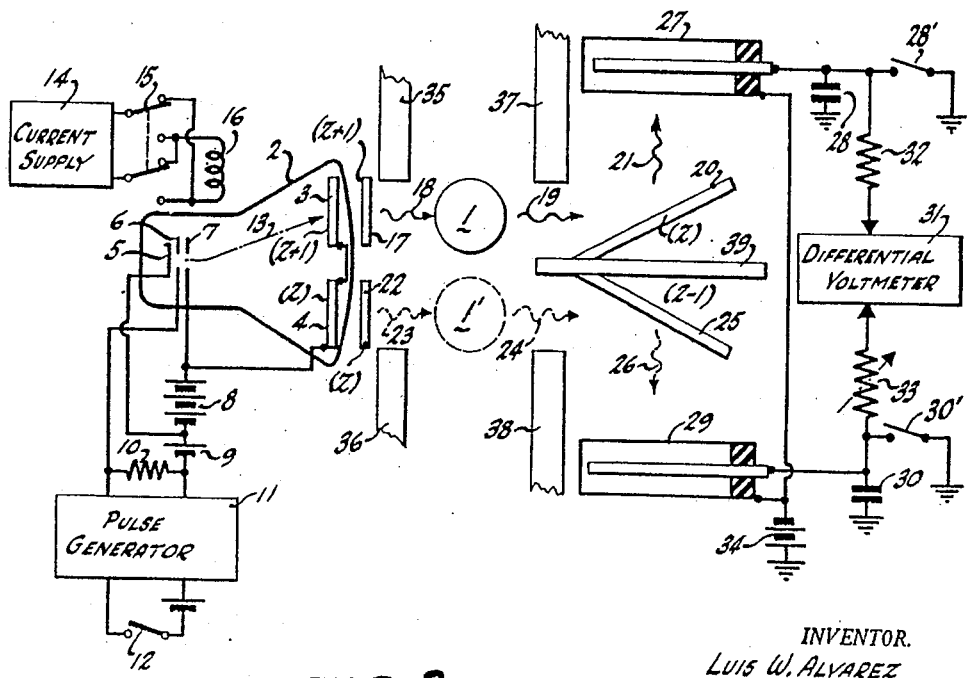
FIG. 3 is a schematic diagram of an X-ray spectroscopic apparatus embodying this invention.

Referring to FIG. 3, the circle 1 represents a body of matter of unknown composition with respect to a selected element of atomic number Z, e.g., tin of atomic number 50. To determine whether or not body 1 contains an appreciable amount of the selected element, the X-ray absorption of body 1 will be measured at wavelengths above and below the K absorption edge of the selected element. More specifically, absorption will first be measured at wavelengths between the K absorption edges of the selected element and the element of next higher atomic number (Z+1); then the body 1 which will be moved to the position represented by broken-line circle 1' and its X-ray absorption will be measured at wavelengths between the K absorption edges of the selected element and the element of next lower atomic number (Z−1).

The preferred X-ray source is a novel X-ray tube containing, within an evacuated envelope 2, a pair of targets 3 and 4 and an electron gun comprising cathode 5, control grid 6, and anode 7. Except for the targets 3 and 4, the construction of the X-ray tube is similar to that of a high-voltage cathode ray tube or television picture tube. The electron gun provides a high enough beam voltage, e.g., 50,000 volts, to generate the K-line emission spectra of the target elements. In a typical circuit, a high-voltage supply 8 has its negative terminal connected to the cathode 5 and its positive terminal connected to anode 7 and the two targets 3 and 4. The grid 6 is biased to cut-off by bias supply 9 connected through grid resistor 10. The tube is turned on by positive voltage pulses supplied to the grid by pulse generator 11 (e.g., a monostable multivibrator) responsive to a timing signal supplied, for example, by the closing of switch 12. Thus, an accurately repeatable burst of X-rays is generated each time that timing switch 12 is closed. The electron beam 13 is deflected to the two targets 3 and 4 alternately for alternate bursts by suitable deflecting means, represented schematically by the current supply 14, reversing switch 15, and magnetic deflection coil 16.

Target 4 consists, at least in part, of the selected element of atomic number Z—e.g., tin—whereby bombardment of target 4 by electron beam 13 generates X-rays exhibiting the K lines of the emission spectrum of the selected element as well as a continuous spectrum of "white" X-rays. Target 3 is composed, at least in part, of the element of next higher atomic number (Z+1)— e.g., antimony—and therefore bombardment of target 3 by beam 13 produces X-rays exhibiting the K lines of the emission spectrum of antimony, as well as a continuous spectrum of "white" X-rays.

Assuming that the selected element is tin, atomic number 50, the element of atomic number (Z+1) or 51 is antimony, and bombardment of target 3 by the electron beam 13 of adequate voltage will produce X-rays at wavelengths corresponding to all of the K lines of antimony shown in FIG. 2, along with other lines in the emission spectrum of antimony and a broad continuous spectrum of heterogeneous or "white" X-rays extending to both longer and shorter wavelengths than the K lines illustrated in FIG. 2. What is desired is only the $K_{\beta 1}$ and $K_{\beta 2}$ lines of antimony. The other wavelengths are eliminated by a novel X-ray band-pass filter, as follows:

Immediately in front of target 3 (usually, but not necessarily, outside the evacuated envelope) is a plate 17 likewise composed, at least in part, of the element of atomic number (Z+1), in this case antimony. Referring to FIGS. 1 and 2, it will be seen that the plate 17 is relatively transparent to (slightly absorbs) the K-line emission of target 3, but is relatively opaque to (greatly absorbs) wavelengths somewhat shorter than the K absorption edge of antimony. Hence, plate 17 acts as a low (frequency) pass filter for transmitting essentially only that portion of the X-ray emission from target 3 having longer wavelengths than the K absorption edge of antimony. The filtered X-rays that pass through plate 17 into body 1 are represented by the symbol 18.

In passing through body 1, the X-rays are attenuated by an amount which is a function of the thickness of the body, its density, and its composition. The unabsorbed X-rays emerging from the other side of body 1 are represented by symbol 19. Placed in the path of these emerging X-rays and at an angle thereto, as is more fully explained hereinafter, is a plate 20 composed, at least in part, of the selected element of atomic number Z, in this case tin. X-rays of shorter wavelengths than the K absorption edge of tin—specifically the antimony $K_{\beta 1}$ and $K_{\beta 2}$ lines—are strongly absorbed by plate 20, while X-rays of longer wavelengths, specifically the $K_{\alpha 1}$ and $K_{\alpha 2}$ lines of antimony, pass through plate 20 with relatively little absorption. The tin atoms in plate 20 are excited by the absorbed radiation, and reradiate the X-rays represented by symbol 21 as they return to normal states.

In other words, plate 20 is an X-ray fluorescent radiator which is substantially responsive only to X-rays of shorter wavelength than the K absorption edge of the element having atomic number Z. Hence, the intensity of X-rays 21 is proportional to the intensity of those X-rays 19 having wavelengths shorter than the K absorption edge of tin. Thus, the combined effect of plates 17 and 20 is to provide a "band-pass filter," which transmits X-rays 21 principally in response to those X-rays emitted by target 3 having wavelengths lying between the K absorption edge of antimony and the K absorption edge of tin. As a result, the intensity of X-rays 21 is inversely related to the absorption of X-rays by body 1 in the narrow band of wavelengths between the two specified K- absorption edges. The device described differs from a true filter chiefly in that the X-rays 21 are of longer wavelength than the primary X-rays within the band between the two absorption edges.

In a similar manner, the X-rays from target 4 are filtered by passing first through a plate 22, composed at least in part of the element having atomic number Z, e.g., tin, so that the X-rays 23 are substantially limited to wavelengths longer than the K absorption edge of tin. X-rays 23 are partially absorbed by the body 1 in its moved position 1', and the transmitted portion of the X-rays 24 is directed onto another X-ray fluorescent radiator—a slanting plate 25 composed, at least in part, of the element having atomic number (Z—1), in this case indium. Plate 25 absorbs and principally responds to X-rays of shorter wavelength than the K absorption edge of indium, and radiates X-rays 26. Hence, the intensity of X-rays 26 is an inverse function of the X-ray absorption by body 1 in the narrow band of wavelengths between the K absorption edges of tin and indium.

The intensities of X-rays 21 and 26 are measured and compared by appropriate means. As illustrated, X-rays 21 enter an integrating ionization chamber 27 which stores upon capacitor 28 (either an external capacitor or the capacitance inherent in the structure of the ionization chamber), a voltage proportional to the average intensity of a burst of X-rays 21. Similarly, an integrating ionization chamber 29 stores on capacitor 30 a charge proportional to the intensity of a burst of X-rays 26. These two stored charges are compared—e.g., by a differential voltmeter 31 which may be connected to the two capacitors through resistors 32 and 33, at least one of which preferably is made adjustable for calibration purposes. Operating voltage for the ion chambers is supplied by source 34, and switches 28' and 30' are provided for discharging capacitors 28 and 30 prior to the next set of measurements.

To prevent undesired interactions, e.g., the direct passage of X-rays from the X-ray tube to the ionization chambers, etc. and for other obvious purposes, shielding is provided as indicated by schematic fragments at 35, 36, 37, 38, and 39. Shielding 35—38 may conveniently be sheets of lead, say one-quarter inch thick, for restricting the X-rays to the beam paths indicated, protecting personnel, and the like. Shield 39, which may be a somewhat thinner sheet of lead, isolates the two halves of the X-ray system from each other and prevents undesirable interactions between them.

Before using the apparatus for actual test purposes, it should be calibrated by adjusting resistor 33 so that differential voltmeter 31 reads substantially equal values for the X-rays 21 and 26 when there is none of the selected element, e.g., tin, in the path of the X-ray beams. After calibration, tests may be made by placing object 1 in the position shown by the unbroken circle, positioning switch 15 to deflect the electron beam 13 to target 3, and closing switch 12 momentarily to generate a burst of X-rays 18, 19, 21. A charge proportional to the intensity of X-rays 21, and hence inversely related to the X-ray absorption of body 1 at wavelengths somewhat longer than the selected absorption edge, is stored on capacitor 28. Next the body 1 is moved to the broken-circle position 1', switch 15 is reversed to deflect the beam 13 to target 4, and switch 12 is again closed momentarily to produce a burst of X-rays 23, 24, 26. The charge stored on capacitor 30 is proportional to the intensity of X-rays 26, and hence inversely related to the absorption of X-rays by body 1 at wavelengths somewhat shorter than the selected absorption edge. The difference in the two stored charges can be read by differential voltmeter 31. If the voltmeter (properly calibrated) reads a larger charge on capacitor 28 than on capacitor 30, then the body 1 does not contain appreciable quantities of the selected element having atomic number Z—e.g., tin. On the other hand, if voltmeter 31 reads a larger charge on capacitor 30, then body 1 does contain the selected element.

Figure 4:
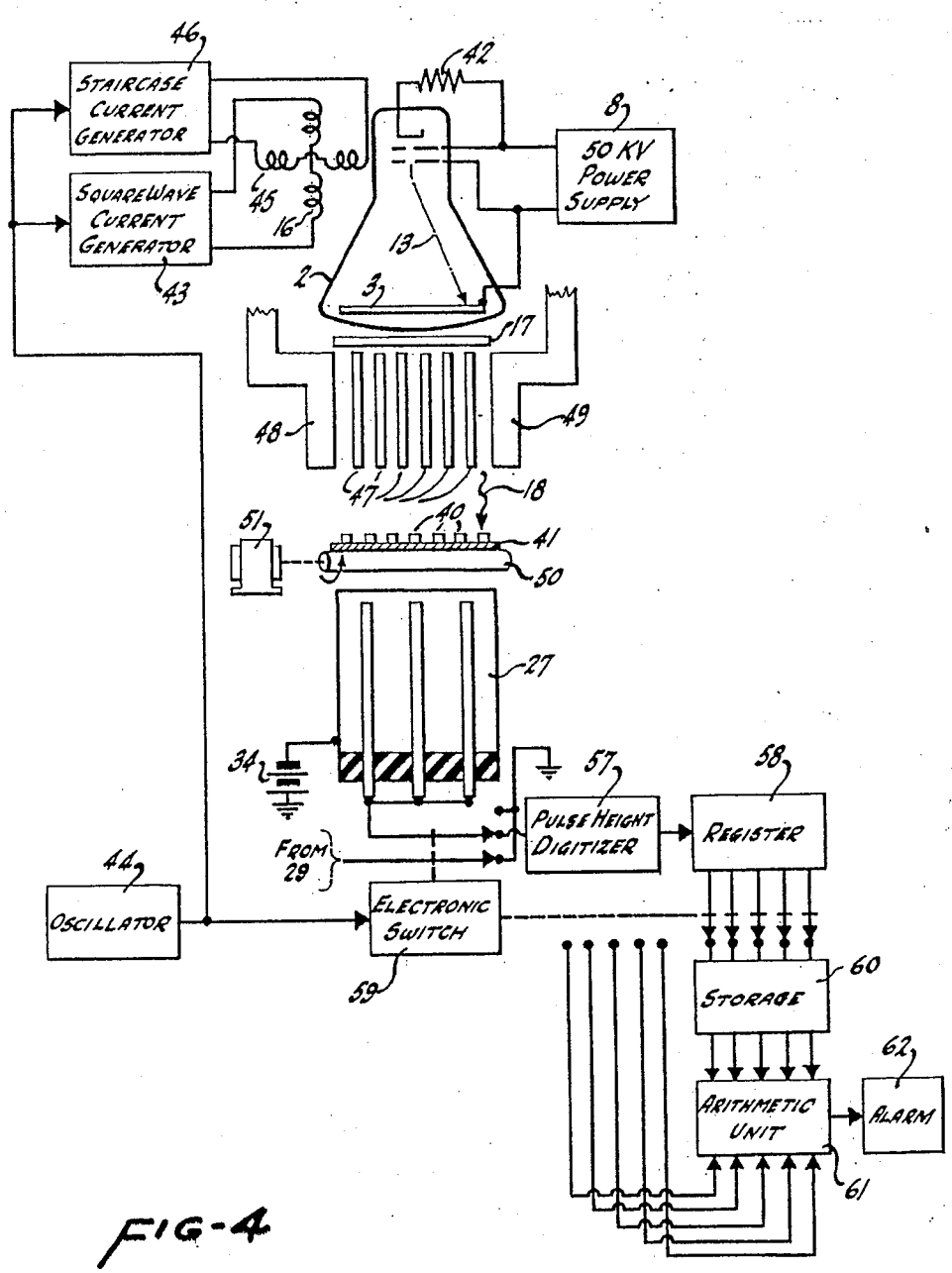
FIG. 4 is a schematic diagram of another embodiment.

FIG. 4 shows how the apparatus can be adapted to the continuous inspection of articles 40 carried by a moving conveyer belt 41, or the like. By way of example, articles 40 could be manufactured products, lumps of ore, or any other bodies in which inspection is desirable to determine whether or not a selected element is present. As is more clearly shown in FIG. 5, the articles 40 may be arranged in rows and columns on the belt 41—but this is not essential—the circles 40 of FIG. 5 can represent mere inspection areas, which can be made sufficiently large and close together to cover substantially the entire surface of the belt, so that one or more inspection areas will fall on each physical object to be inspected, even though the sizes, locations and orientations of the actual objects may be randomly distributed within a considerable range.

The X-ray tube may be substantially as already described, the two targets being in the form of parallel strips inside the face of the tube. FIG. 4 shows the tube rotated 90° from the position shown in FIG. 3, so that a lengthwise edge of target strip 3 is visible in FIG. 4, whereas FIG. 3 shows the ends of the target strips 3 and 4. Operating voltage for the tube is supplied by a 50,000-volt power supply 8, and the beam current is regulated by means of the cathode resistor 42. The electron beam can be pulsed on and off or it can remain on continuously, the X-rays being generated in bursts of alternate wavelengths in any event by the scanning of the beam back and forth between the two targets. This scanning is accomplished by connecting to winding 16, of the magnetic scanning yoke, a squarewave current generator 43 synchronized with the master timing oscillator 44 of the system.

The beam 13 is also scanned lengthwise of the target strips 3 and 4 by supplying to a second winding 45 of the deflection yoke, windings 16 and 45 having orthogonal axes, a current of staircase waveform produced by the staircase current generator 46, which also operates in synchronism with timing oscillator 44, there being one step of the staircase waveform for each full cycle of the squarewave current supplied by generator 43.

The X-rays generated by the tube are collimated by means of parallel spaced-apart lead plates 47 defining parallel open spaces through which collimated rays of X-rays 18 can pass without attenuation. Any rays traveling at an angle to the desired direction have to pass through one or more of the plates 47 and are greatly attenuated. Thus X-rays are directed, at any given instant, only onto that one of objects 40 which is aligned directly below the point of impact of beam 13 on one or the other of the X-ray tube targets. As the beam is scanned along the length of the target strips 3 and 4, successive ones of the objects 40 spaced across the width of belt 41 are subjected to X-ray examination. It is not necessary that the number of open spaces between plates 47 be equal to the number of objects to be examined—preferably the plates 47 are more closely spaced so that each object 40, wherever located, will be in line with several of the open spaces. For example, the plates 47 may be spaced at quarter-inch intervals, whereas the size of each object 40 may be two or three inches. Also, electron beam 13 can be focussed or defocussed to a relatively large spot on the targets so that X-rays will be emitted simultaneously by target areas aligned with several adjacent ones of the open channels between plates 47. Thus alignment difficulties are avoided.

The relatively thick shielding members 48 and 49 insure that radiation outside the desired beam will be negligibly small.

The belt 41 is kept moving continuously by rollers 50 driven, for example, by motor 51, so that a new row of the objects 40 is brought into the inspection area as fast as the inspection of a previous row is completed. The scanning procedure is more clearly shown in FIG. 5, wherein the direction of movement of the belt is indicated by arrow 52 while the scanning sequence is represented by zig-zag arrows 53, 54, 55, and 56. These zig-zag arrows are not intended to represent an accurate tracing of a beam deflection path; they merely show an order of proceeding from one object (or inspection area) 40 to the next.

Referring to arrow 53 for example, and relating directions of motion to FIG. 5, the squarewave generator 43 moves the electron beam back and forth, from left to right and right to left alternately, while the staircase generator 46 moves the beam downward one step concurrently with each left-to-right movement, giving the zig-zag pattern shown, the whole pattern progressing relatively slowly to the right due to the right-to-left movement of the belt 41. At the corners on the right side of the zig-zag path 43, the electron beam strikes electrode 3 and sends through the aligned article or area 40 a burst of X-rays having wavelengths shorter than the K absorption edge of the selected element, and at each corner on the left side of the zig-zag path the beam strikes target 4 to generate a burst of X-rays having wavelengths longer than the same K absorption edge. From the bottom of zig-zag line 53 the scanning sequence repeats, starting at the top of zig-zag line 54, etc., each zig-zag being spaced from the preceding one by the continuous movement of belt 41. It will be noted that each of the articles or areas 40 is irradiated twice, first at the shorter wavelength and then at the longer.

Referring to FIG. 4, it will be noticed that the ionization chamber 27 is of sufficient width to be effective across the entire width of belt 41, and may contain multiple anodes. Chamber 29 and the X-ray fluorescent radiators 20 and 25 between the two ionization chambers (shown in FIG. 3 but not in FIG. 4, the two figures being views at 90° to each other) are of similar width. As was explained in connection with FIG. 3, ionization chamber 27 is active when the electron beam 13 of the X-ray tube is directed onto target 3, and ionization chamber 29 is active when the electron beam is directed onto target 4. Hence, the two ionization chambers produce electric pulses alternately when the beam is scanned back and forth continuously by squarewave current generator 43 of the FIG. 4 apparatus. The height of each pulse is proportional to the intensity of a corresponding burst of X-rays 21 or 26. What is now needed is automatic means for measuring and remembering the height of each pulse from chamber 27, and comparing this with the height from the corresponding pulse from chamber 29 during the next scanning cycle, when the same area 40 is subjected to X-rays of the longer wavelength. A preferred embodiment of such means consists of a conventional electric pulse height digitizer 57 connected to receive each of the pulses from ionization chambers 27 and 29, alternately, and for each input pulse to supply at its output a number of electric pulses representative of the height of the measured pulse. The output pulses from digitizer 57 are accumulated in a conventional electronic pulse-counting register 58, whereby register 58 provides at its several output leads a parallel-binary electric signal representing in binary numerical form the height of the measured pulse, and therefore the intensity of the corresponding X-ray burst.

An electronic switch 59, synchronized with oscillator 44, connects ionization chambers 27 and 29, alternately, to the input of digitizer 57, and connects the outputs of register 58 alternately with a storage device 60 and the lower set of inputs of a computer arithmetic unit 61. When not connected to the digitizer, the inner electrodes of the ionization chambers are grounded. The numbers representing the heights of pulses from ionization chamber 27 (in shorter wavelength) are fed into storage, while the numbers representing the heights of pulses from ionization chamber 29 (the longer wavelength) are fed directly to the arithmetic unit 61. The capacity of storage device 60 is sufficient for storage of all the numbers that it receives during one scanning cycle of the electron beam along the lengths of the targets 3 and 4 in the X-ray tube, and thereafter the numbers pass out of storage in the order of their receipt into the arithmetic unit 61. In other words, storage 60 delays the numbers fed into it by the length of time required to complete a scanning cycle across the width of belt 41, which is also equal to the time required for the belt to move a distance equal to the distance between the centers of targets 3 and 4 of the X-ray tube, whereby the two numbers fed simultaneously into arithmetic unit 61 are representative of X-ray absorption at two different wavelengths by material at the same inspection area 40.

In essence, unit 61 is a subtraction unit which compares the two numbers supplied to it concurrently as a measure of the difference in the absorption of X-rays at the two selected wavelengths. As explained previously, such a comparison indicates whether or not an appreciable quantity of the selected element, having an absorption edge lying between the two chosen wavelengths, is or is not present in the body under examination. Either a positive or negative remainder, depending upon the result desired, can be made to operate any appropriate alarm device 62. If desired, the arithmetic unit may also contain obvious circuits for actuating the alarm if the absolute magnitude of either number supplied to unit 61 either exceeds a preset value or is less than a preset value, to prevent undesired operation of the alarm, or to cause unvarying operation of the alarm, as desired, in the event that X-ray absorption is substantially zero due to absence of any object at a particular location on the belt, or in case X-ray transmission is substantially zero due to complete X-ray opaqueness of a particular object.

FIG. 6 is a detail illustrating a preferred construction of the X-ray tube targets. As hereinbefore explained, the major portion of the X-ray tube, specifically the envelope, electron gun, and deflection system, may be essentially the same as corresponding parts of a conventional high-voltage cathode ray tube, and in fact the X-ray tube may be made by a simple modification of a cathode ray tube. In FIG. 6, the showing at 2' represents a small section of the conventional glass face of a cathode ray tube, and the layer 63 on the inside surface of this glass face is the conventional phosphor employed to produce a spot of visible light at the point of impact by the electron beam. Targets 3 and 4 can be strips deposited inside the normal phosphor layer 63, as shown. It is not necessary that the targets be of the pure elemental material—compounds containing the element desired are quite suitable, and are usually more easily deposited to form the targets.

According to the notation used in FIG. 6, the letter Z represents the desired element of atomic number Z and the symbol ZX represents any appropriate compound of this element. For example, the element Z may be a metal, e.g., tin, and the compound ZX may be one of its oxides. Oxygen having a very low atomic number compared to tin, the presence of the oxygen has no important effect upon the desired production of X-rays by bombardment of the tin. In the choice of compounds, it is generally desirable that the element Z be of considerably higher atomic number than the other constituents of the compound.

Similarly, the filter plates 17 and 22 likewise may be compounds deposited upon the face of the cathode ray tube envelope, or they may be plates or panels of such compounds placed close to the tube face. Thus, the novel X-ray tube herein described can quite easily be manufactured by simple modification of presently available cathode ray tubes. For superior performance however, the glass face plate 2' could advantageously be replaced with an aluminum plate, there being no need for the transmission of visible light through the face plate and the aluminum being quite transparent to X-rays. Also, phosphor 63 may be omitted.

FIG. 7 is a fragmentary detail illustrating construction of the X-ray fluorescent radiator 20. This may be a thin layer of a compound ZX containing the desired element Z deposited upon any suitable backing 64, e.g., a sheet of aluminum. The radiator 20 is preferably aligned with its surface at a small angle to the incident X-rays 19, so that the X-rays enter coating 20 at a low grazing angle (angle of incidence near 0°) and travel through a large thickness of the material relative to the distance that they penetrate below the surface. Thus, the excited atoms are very close to the surface of the radiator, and the radiated X-rays 21 can escape by traveling through a very thin layer of solid material. Escape is also aided by the lower mass absorption coefficient of the compound ZX to the radiated X-rays 21, which are of longer wavelength than the primary X-rays 19 and lie to the other side of the K absorption edge.

It is easily possible to replace the ionization chambers with other types of radiation detectors. For example, as shown in FIG. 8, the two ionization chambers 27 and 29 may be replaced by scintillation counters 65 and 66. Whereas the integrating ionization chambers have an output of one pulse per X-ray burst, the pulse height being a measure of the intensity, the scintillation counters have an output consisting of many pulses per X-ray burst, the pulse count being the measure of X-ray intensity. Consequently, with the scintillation counter no pulse height digitizer is required (although it may be necessary to add amplifiers and the like, not illustrated, and this may lead to a more complicated rather than a simpler circuit). The electronic switch 59', in addition to switching the register output as shown in FIG. 4, also connects the two counters to register 58 alternately, so that register 58 accumulates successive numbers, alternate ones of which represent the intensity of X-ray bursts received by counter 65, and other alternate ones represent X-ray bursts received by counter 66.

FIG. 9 shows an embodiment in which radioactive materials are used for the X-ray source. In general, radioactive isotopes of different elements will have to be employed to produce the two wavelengths required, but the two isotopes may be combined in a mixed radioactive source 67. Assume, for example, that the selected element which is to be detected is barium. Spectral lines of appropriate wavelength are found in the emission spectra of barium and samarium, and these are generated in the course of the radioactive decay of cesium 137 and europium 152, respectively. Hence, the source 67 may contain a mixture of cesium 137 and europium 152, and the emitted X-rays 68 will contain components of the desired wavelengths.

The unabsorbed X-rays 69 are received by a proportional counter 70 having frequency-distinguishing properties. In the assumed example, a proportional counter filled with xenon at atmospheric pressure has the desired properties. Due to escape peaks, the xenon-filled proportional counter produces pulses differing in amplitude by almost two to one responsive to the barium $K_t$ X-rays from the decay of cesium 137 and the samarium $K_a$ X-rays produced by the decay of europium 152. Hence, the two sets of pulses are easily separated electronically, i.e., by connecting the output of proportional counter 70 to two pulse height selectors 71 and 72 in parallel.

Selector 71 is set to transmit only the high-amplitude set of pulses, and selector 72 is set to transmit only the low-amplitude set of pulses. The outputs from the two pulse height selectors are fed to opposed inputs of reversible pulse counter 73, which thus gives an indication of the difference between the number of high-amplitude pulses and the number of low-amplitude pulses. From this, the device being properly calibrated in advance, it is readily apparent whether an appreciable quantity of the selected element is present within body 1.

An alternative arrangement of the radiators 20 and 25 is illustrated in FIG. 10, wherein the two radiators are essentially parallel. The active parts of the two radiators are thin films composed at least in part of the two elements having atomic numbers (Z) and (Z−1), respectively. These films are supported upon plates 64 and 64' of a material that is relatively transparent to X-rays—e.g., aluminum. The X-rays 24 pass through the aluminum plate 64' with little attenuation, and certain frequencies are absorbed in the thin film containing element (Z−1), resulting in the radiation of X-rays 26, as hereinbefore explained. The film is so thin that X-rays 26 readily escape from either side, the lead shield 39 preventing undesired passage of X-rays between the two radiators. The radiator arrangement shown in FIG. 10 has a little bit more symmetry than that shown in FIGS. 3 and 8, and may give more nearly equal signals in the absence of the selected element Z within sample 1.

In its broader aspects, this invention is not limited to specific examples illustrated and described; numerous changes and modifications can be made without departing from the inventive principles herein described.

What is claimed is:

1. X-ray spectroscopic apparatus comprising a source of X-rays exhibiting spectral lines at wavelengths both longer and shorter than the wavelength corresponding to an X-ray absorption edge of a selected one of a group of elements but respectively shorter and longer than the wave lengths of the K absorption edges of the elements of said group of the next lower and next higher atomic numbers respectively, shielding means adjacent to said source and having an aperture defining a beam of said X-rays, X-ray intensity measuring means disposed in said beam and spaced from said source a sufficient distance for the placing of bodies to be examined therebetween, said intensity measuring means comprising two X-ray fluorescent radiators in the path of said beam, one of said radiators consisting at least in part of one of the elements of said selected group of elements and the other radiator consisting at least in part of the elements of the group of next lower or higher atomic number, two X-ray measuring devices arranged to receive X-rays radiated by fluorescence of respective ones of said two radiators, and means connected to said measuring devices for indicating differences in the measured values thereof for identifying the presence of elements of said selected group of elements.

2. Apparatus as in claim 1, said radiators comprising two plates arranged in a narrow, V-shaped configuration between said two measuring devices, with the point of the V facing into the incident X-ray beam and the two plates facing in substantially opposite directions toward said two measuring devices.

3. Apparatus as in claim 1, said radiator comprising two parallel plates arranged in slanting relation to the incident X-ray beam and between said two measuring devices positioned on opposite sides of the incident beam.

4. An X-ray device, for determining the presence in a body being inspected of an element which may be identified by its ability to absorb a selected band of wavelengths in a heterogeneous X-ray beam, comprising first and second members disposed in tandem alignment within said beam so that X-rays must pass through said first member to reach said second member, said first member consisting essentially, with respect to X-ray absorption, of an element having an X-ray absorption edge at the short-wavelength end of the selected band, whereby X-rays of shorter wavelength are substantially eliminated by preferential absorption in the first member, said second member consisting essentially, with respect to X-ray absorption, of an element having an X-ray absorption edge at the long-wavelength end of the selected band, whereby X-rays of wavelengths within the selected band only are substantially absorbed by said second member and cause X-ray fluorescence thereof, and means responsive to X-rays positioned to receive and record the proportionate amount of the X-rays radiated by fluorescence of said second member after passage of the X-rays through the body being inspected.

5. An X-ray device as in claim 4, said first member consisting of a flat plate perpendicular to the beam, said second member consisting of a flat plate inclined at an angle of more than 45° to the beam.

6. An X-ray device as in claim 4, wherein said two elements have consecutive atomic numbers, the element comprised in said second member having the lower atomic number.

References Cited in the file of this patent
UNITED STATES PATENTS

| | | |
|---|---|---|
| 2,009,498 | Kerr | July 30, 1935 |
| 2,322,556 | Ziebolz | June 22, 1943 |
| 2,760,055 | Laster | Aug. 21, 1956 |
| 2,784,319 | Flook et al. | Mar. 5, 1957 |
| 2,897,367 | Andermann et al. | July 28, 1959 |
| 2,897,371 | Hasler | July 28, 1959 |
| 2,999,935 | Foster | Sept. 12, 1961 |
| 2,999,937 | Kohler | Sept. 12, 1961 |

OTHER REFERENCES

Elements of X-ray Diffraction, by Cullity, Addison-Wesley Publishing Co., Reading, Mass., 1956, pp. 211 to 213.